Patented May 14, 1946

2,400,171

UNITED STATES PATENT OFFICE 2,400,171

STABILIZED METAL ASCORBATES

Simon L. Ruskin, New York, N. Y., assignor to Frances R. Ruskin

No Drawing. Application November 16, 1935, Serial No. 50,237. In Canada September 26, 1935

3 Claims. (Cl. 167—81)

This invention relates to medicinal preparations, more particularly to stabilized metal salts of an organic acid having the following structural formula:

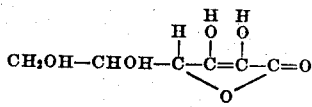

This compound is known as cevitamic or laevo-ascorbic acid. It is a white or slightly yellowish crystalline material which is readily soluble in water and certain organic solvents. It has been determined that this substance is the nitritive factor known as vitamin C.

While this compound may be used in the treatment of diseases caused by deficiency of vitamin C, it is highly desirable that the effectiveness of this compound for said control of diseases be substantially increased. It is also highly desirable that the therapeutic properties of the compound be coupled with other substances having therapeutic properties in order that the resulting compound may have additional curative values not possessed by the original acid and thus be effective for control and cure also of other diseases.

It is, therefore, among the objects of the present invention to modify ascorbic acid by converting it into its calcium and zinc salts whereby its value in the treatment of diseases is materially increased.

More particularly it is an object of the invention to produce therapeutic agents or medicinal preparations containing a calcium or zinc salt of ascorbic acid and stabilized by the addition of an anti-oxidation stabilizing agent.

More specifically, it is an object of the invention to produce stabilized preparations of calcium and zinc compounds of ascorbic acid which I have found to possess the vitamin-like properties of such acid while at the same time incorporating the metal in a form readily assimilable by the animal organism. Thus I have found that calcium ascorbate increases the calcium content of the blood much better than any other calcium compounds known to me, being more readily absorbed and maintaining the calcium content at a higher level than similar quantities of other calcium salts, this being due in large part to the very high solubility and degree of ionization of the salt. It may be employed in the same manner as known therapeutic calcium salts, like calcium gluconate, except that, being much more soluble than the latter, it can be used in stronger solutions. Even when used in strong solution, it does not have any untoward effects on injection. I have found that in the treatment of rickets calcium ascorbate is more effective than other calcium salts and produces evidence of more rapid clinical improvement. In the treatment of pyorrhoea alveolaris, calcium ascorbate diminishes the tendency toward bleeding of the gums, stops the recession of the alveolus from the crown of the tooth and causes rapid improvement of the condition. This calcium salt, moreover, effects more ready deposition of calcium in tooth formation. It is also an active agent in strengthening the structure of the blood vessels and in promoting clotting of the blood, thereby reducing hemorrhages.

In carrying out the objects of my invention, I first dissolve ascorbic acid in a suitable solvent, preferably water. To the solution thus formed I may add a solution of a base or salt of calcium or zinc or the solid compound itself. In most cases the reaction between the acid and the base or salt takes place spontaneously without the application of heat or pressure. It is sometimes desirable to moderately heat the reaction mixture in order to speed the reaction and render it more complete. In some cases, the reaction may be caused to take place under pressure and heat may be used simultaneously therewith. Where a carbonate is employed, I prefer to conduct the reaction in the cold, or with a minimum of heat, in order to keep as much as possible of the carbon dioxide in solution, as the gas increases the solubility of the metal ascorbate and preserves it.

In other cases the procedure may include the preparation of a solution of ascorbic acid in water, to which is added a sufficient amount of a caustic alkali solution, such as sodium hydroxide, to cause the formation of the corresponding ascorbate. To this solution there may then be added a solution of a salt of calcium or zinc. The solution may in certain cases be heated in order to cause the reaction to take place, although in many instances the reaction will go quickly to completion in the cold. If the resulting metal compound is soluble in the solution, then suitable steps are taken to effect separation from the alkali metal compound, such as the addition of solvents in which one of the compounds is insoluble, or by fractional crystallization or in any other suitable manner. The ascorbate may be purified by dissolving the impure compound and recrystallizing the same, one or a number of times.

I have found further that the reactions should preferably be conducted in an oxygen-free atmosphere, although this is not absolutely necessary; in fact, even the water may be de-aerated, as by boiling or by passing a current of an inert gas therethrough. Free oxygen destroys to a large degree the potency of the ascorbates and of the ascorbic acid and for best results the whole process, from the solution of the ascorbic acid to the packaging of the purified salt, should be performed in an inert atmosphere. The final product may be either a solution, which can be packaged in ampules, capsules, etc., in an inert gas, or a solid, obtained by evaporation of the solution to dryness, preferably with the aid of vacuum; the solid material can be prepared for the market in tablet form, and the tablets may be coated with a soluble film which is impervious to air, for example, gelatine.

While various inert gases may be used, I prefer the use of $CO_2$ as this gas appears to increase the solubility of the ascorbic acid salt. The solution of the ascorbic acid salt or the tablets or other solid preparation composed of or containing such salt may be stabilized and protected against oxidation and resulting diminution of strength by adding thereto any suitable reducing agent, anti-oxidant or anti-oxidation catalyst. I have found acetanilid to possess an excellent stabilizing and protecting action for the ascorbates and also for the free ascorbic acid, but other compounds having similar effects may be employed, such as calcium saccharate. The control of pH is best at 7. to 7.3 although ranges above and below may be employed.

The present application is a continuation in part of my co-pending application Serial No. 745,527, which has issued as Patent No. 2,260,870.

To illustrate more in detail the nature of my invention, the following example is presented, but it is to be understood that the invention is not limited thereto:

*Example*

12.896 grams of laevo-ascorbic acid are dissolved in water, for example, to a 10% solution. Into this solution there is then introduced, at room temperature, 3.354 grams of calcium carbonate, which represents a slight excess of ascorbic acid over the theoretical. The reaction is conducted in the cold so that the $CO_2$ formed in the reaction is kept in solution. The calcium ascorbate is passed cold through the Berkefeld filter and filled in ampules in an inert atmosphere, preferably of $CO_2$. An atmosphere of carbon dioxide is especially advantageous as the gas appears to increase the solubility of the salt in water, thereby enabling solutions of higher concentration to be obtained as the final product. To obtain a solid product, the solution is evaporated, preferably under vacuum in the cold, the salt being white or yellowish white in color. This product may likewise be packaged in an inert atmosphere and as already indicated, when prepared in tablet form, it may be given a gas-impervious coating, although the product may be prepared also in uncoated or unstabilized form.

The amount of water can, of course, be varied within wide limits. I have found that calcium carbonate yields a clear solution of calcium ascorbate when reacted with ascorbic acid, and similar results are obtained with calcium hydroxide. Calcium gluconate and phosphate, on the other hand, do not give as clear solutions, although they may, if desired, be used.

In similar fashion, either by treatment of the ascorbic acid directly with a base, or by treatment of the alkali metal salt of the acid with a salt, such as the chloride, of zinc, etc., the ascorbic acid salts of these metals, or solutions containing the same, may be prepared. Thus where sodium ascorbate is treated with a chloride, it is frequently unnecessary to separate the products of the double decomposition since the presence of the sodium chloride is desirable in solutions which are to be injected into the animal organism, being of course added to make up isotonic solutions. Each of these metals, or mixtures thereof, can thus be introduced into the body in the form of a compound which is readily absorbed in the blood stream and preserves its essential character and is retained in the blood stream for quite long periods of time. These compounds thus combine the therapeutic value not only of the ascorbic acid but also of the metal.

In general, these compounds as well as compounds of the ascorbic acid with other metals are of value in the formation of true bone in proper metabolism of mineral salts and in the proper clotting of blood. They are also of general value in diseases and conditions caused by a lack of vitamin C.

It will, of course, be apparent to those skilled in the art that the above description of process may be varied to considerable extent within the scope of my invention. For example, the various compounds may be formed by other processes than disclosed above. The resulting compounds may be used without purification or various purifications of the same may be conducted. In order to render some of the compounds more soluble, I may use buffers, such as sodium citrate, or other suitable substances. The amount of the buffer may be varied at will and within wide limits. Usually, the solubility is dependent upon the hydrogen ion concentration and such buffers tend to prevent changes of solubility of the compounds with changes of pH.

While in the above example, I have mentioned the use of calcium carbonate and hydroxide, it is obvious that various salts of calcium, such as the chloride, nitrate, acetate, and others may be substituted for the same in the hereinbefore described modification of my process, wherein the ascorbic acid is first neutralized with a caustic alkali solution. Similarly, various salts also of zinc may be used in preparing the ascorbic acid compound thereof. Where the ascorbate is more or less insoluble or gives cloudy solutions, it may be rendered more soluble by the addition of sucrose, dextrose, glucose, mannose, and in fact, almost any other carbohydrate of the sugar type.

In place of ascorbic acid I may utilize a derivative of ascorbic acid such as the monoacetone derivative or other organic derivatives of such acid.

I claim:

1. A therapeutic preparation comprising a laevo-ascorbic acid compound of a metal of the group consisting of calcium and zinc, and acetanilid.

2. A medicinal preparation for injection into the animal organism for the treatment of calcium deficiency diseases, and consisting essentially of a substantially pure calcium salt of laevo-ascorbic acid mixed with an anti-oxidation stabilizing agent.

3. The method of obtaining a medicinal preparation consisting essentially of substantially pure calcium laevo-ascorbate, which comprises reacting an aqueous solution of substantially pure laevo-ascorbic acid with calcium carbonate, whereby carbon dioxide remains dissolved in the solution of the calcium salt, and adding to the solution an anti-oxidation stabilizing agent.

SIMON L. RUSKIN.